May 23, 1950
E. WILDHABER
2,508,556
METHOD OF PRODUCING GEARS
Filed Oct. 25, 1944
3 Sheets—Sheet 1
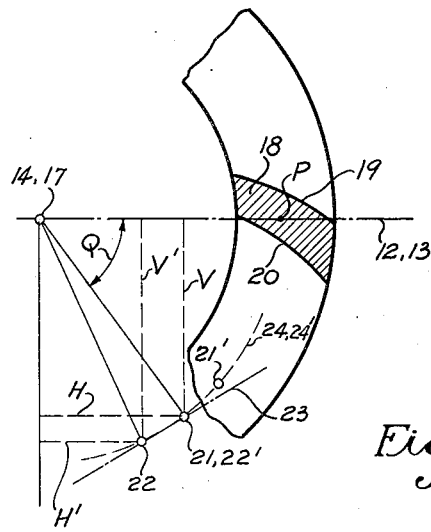
Fig. 1
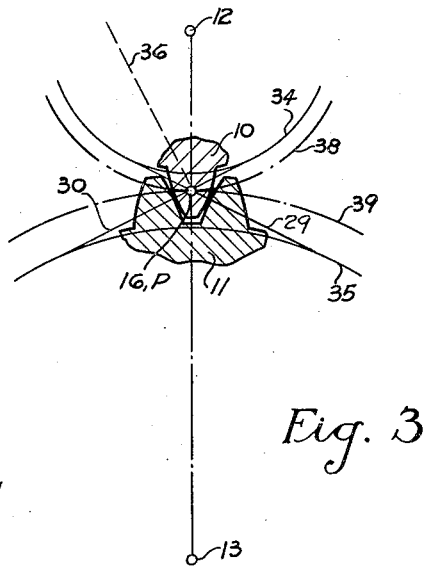
Fig. 3
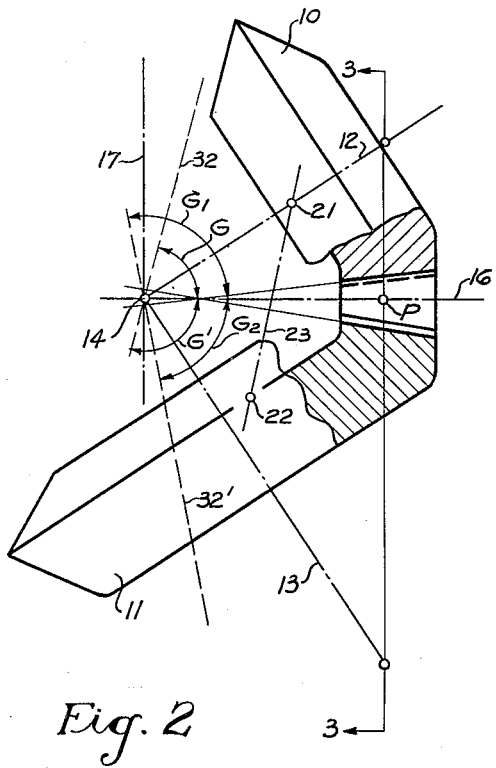
Fig. 2
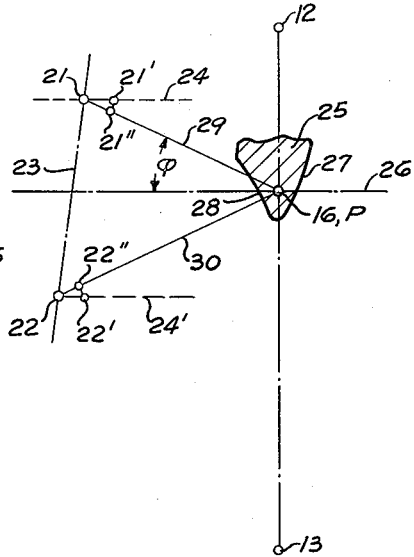
Fig. 4
Inventor
ERNEST WILDHABER
Attorney May 23, 1950     E. WILDHABER     2,508,556
METHOD OF PRODUCING GEARS
Filed Oct. 25, 1944     3 Sheets-Sheet 2
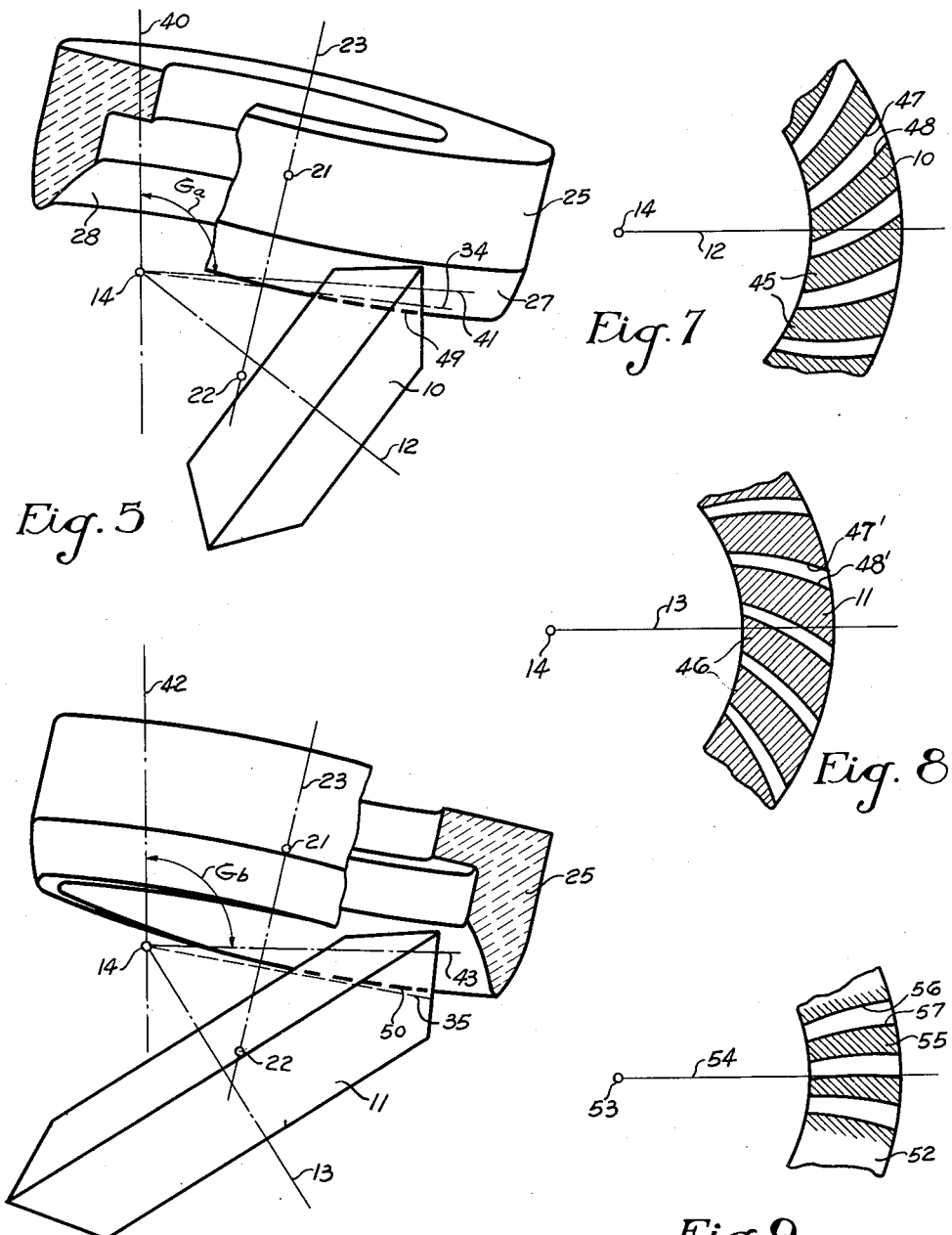
Inventor
ERNEST WILDHABER
By B.J. Schlesinger
Attorney May 23, 1950     E. WILDHABER     2,508,556
METHOD OF PRODUCING GEARS Filed Oct. 25, 1944     3 Sheets-Sheet 3

Inventor
ERNEST WILDHABER
By
Attorney

Patented May 23, 1950

2,508,556

UNITED STATES PATENT OFFICE 2,508,556

METHOD OF PRODUCING GEARS

Ernest Wildhaber, Brighton, N. Y., assignor to Gleason Works, Rochester, N. Y., a corporation of New York Application October 25, 1944, Serial No. 560,284

8 Claims. (Cl. 90—5)

The present invention relates to longitudinally curved tooth bevel gears and to methods for producing such gears.

In the spur gear field, the involute is the best known and most widely used form of tooth. A primary advantage of the involute tooth shape over other tooth shapes in this field is that the center distance, or the distance between the parallel axes of two mating gears may be varied without affecting the motion transmitted. A pair of involute spur gears will continue to transmit uniform motion at any center distance so long as enough of the tooth surfaces of the two gears remain in engagement to transmit motion.

Involute bevel gears have a characteristic analogous to that of the involute spur gears. The angle between the axes of two mating involute bevel gears may be varied without loss of uniformity of motion and without shift of the tooth bearing or contact. In other words, one member of an involute bevel gear pair may be shifted about the common apex of the two gears so that its axis has a different shaft angle with the axis of the mate gear without affecting the correctness of the gear mesh. Another characteristic of mating involute bevel gears is that the gear action or tooth contact takes place on the opposite sides of the teeth in two planes which intersect along the common pitch element of the two pitch cones of the gears and which are tangent to the base cones of the gears. Consequently, the two mating gears will have constant transverse pressure angles all along the lengths of their teeth. A truly involute tooth surface, then, can be described on a bevel gear by a line in the plane tangent to the base cone when that plane is unwrapped from or wrapped about the base cone.

Heretofore, no satisfactory method has existed for generating involute spiral bevel gears. In prior attempts to generate such gears, a tool of zero pressure angle has been used and the tooth surfaces of a gear have been produced by rolling the tool and gear blank together on the base cone of the blank with a constant ratio of generating roll. This method has several distinct disadvantages particularly when the zero pressure angle tool is of annular form, suitable for producing longitudinally curved tooth bevel gears. Thus, if the tool is an annular grinding wheel, it is not at all practical, for its cylindrical grinding surface cannot be dressed without changing the diameter of the tool. On the other hand, if the tool is a face mill cutter, the blades have to be adjusted radially of the cutter axis after sharpening. This is a time-consuming task and difficult to perform accurately. Further, oftentimes the choice of pressure angle to be used on the teeth of the gear, which is to be cut or ground, is limited when gears of large pitch angle are involved, for the base cone should be outside of the root cone of a gear especially in the case of bevel gears having teeth of positive spiral angle, and this is not always possible when annular tools of zero pressure angle are to be employed for the cutting or grinding of the gears. Still further, by any process heretofore known, both sides of the teeth of involute bevel gears cannot be generated simultaneously on both members of the gear pair with an annular cutter or wheel. Moreover, even where the two sides of a tooth space are cut simultaneously on one member of the gear pair only, difficulties are encountered. Thus, an unduly large generating roll must be employed, at least in the production of the ring gear or larger member of the bevel gear pair. In addition, where the two sides of a tooth space are cut simultaneously, they correspond to concentric circles in the base cone development of the gear. In other words, the tooth space in the base cone has a constant width whereas it should ordinarily taper in width from one end of the tooth space to the other, larger at the outside end of the tooth space and smaller at the inside end. The result is that when both sides of the tooth spaces are cut simultaneously on one member of the bevel gear pair, the tooth spaces of the mating gear member are required to have excessive taper. Sometimes, this required taper is so excessive that it may be more practical to cut one side of the teeth at a time on both members of the gear pair. If this is necessary, a very material increase in production time for the involute bevel gear pair results as compared with the production times for bevel gear pairs of other than involute tooth shape. For all of these reasons, involute bevel gears have not come into use despite their obvious advantages.

A primary object of the present invention is to provide a practical method for producing longitudinally curved tooth gears of involute profile shape. To this end, a further object of the invention is to provide a method for producing longitudinally curved tooth gears of involute profile shape in which annular tools of positive pressure angle may be employed.

In a more general aspect, still another object of the invention is to provide a practical method for producing longitudinally curved tooth bevel gears which may be meshed at different shaft angles without loss of uniformity of motion and without shift of tooth bearing or contact.

Another object of the invention is to provide a practical method for cutting the two sides of the tooth spaces of longitudinally curved tooth bevel gears simultaneously on one or both members of a mating gear pair.

Still another object of the invention is to provide longitudinally curved tooth involute bevel gears having correct taper in width of their tooth spaces and suitable pressure angle.

Other objects of this invention will be apparent hereinafter from the specification and from the recital of the appended claims.

In cutting bevel gears according to the process of the present invention, an annular cutter or grinding wheel of positive pressure angle is employed. The axis of the tool is inclined to the blank so as to cut tooth spaces in the blank which taper in depth from their inner to their outer ends, and to avoid "bias bearing," a cutter or grinding wheel of spherical or approximately spherical form is employed. Generation is effected by rolling the tool and work together as though the gear being cut were rolling on a basic gear having a pitch angle of other than 90°. In the prferred embodiment of the invention the tool and work are rolled relative to one another during generation as though the work were rolling with an internal tapered gear represented by the tool and the ratio of relative roll of the tool and work is varied during generation. Thus, both sides of each tooth space of the work may be cut simultaneously to the desired profile shape.

Because of the use of a positive pressure angle tool, there is no change in the diameter of the tool after sharpening or dressing. Moreover with the present method, there is no limitation as to the pressure angle which may be employed in the gears to be cut. Further than this, with the method of the present invention, the base cone does not have to be ouside the root cone; it may be well within the root cone. Neither does the root cone have to be parallel to the base cone. With the method of the present invention, moreover, both sides of a tooth space may be generated simultaneously on one or both members of the gear pair.

In the drawings:

Fig. 1 is a fragmentary view of a bevel gear made according to this invention in development, or of a basic crown gear such as may be used in the production of this bevel gear, and illustrating diagrammatically certain of the principles on which the present invention is based;

Fig. 2 is a view, partly in section, of a pair of involute spiral bevel gears produced according to this invention;

Fig. 3 is a sectional view along the line 3—3 of Fig. 2, further illustrating the construction of these gears;

Fig. 4 is a sectional view, along a line corresponding to the line 3—3 of Fig. 2, showing a tooth of the basic gear or a blade of a cutter such as may be employed in the production of longitudinally curved tooth involute gears according to this invention, and further illustrating the principles on which the invention is based;

Fig. 5 is a diagrammatic view illustrating the production of the pinion or smaller member of a bevel gear pair according to this invention;

Fig. 6 is a diagrammatic view illustrating the production of the mating gear or larger member of the pair;

Fig. 7 is a fragmentary developed sectional view of a spiral bevel pinion generated according to the invention and having longitudinally curved teeth of positive spiral angle;

Fig. 8 is a fragmentary developed sectional view of the mating spiral bevel gear;

Figure 10:
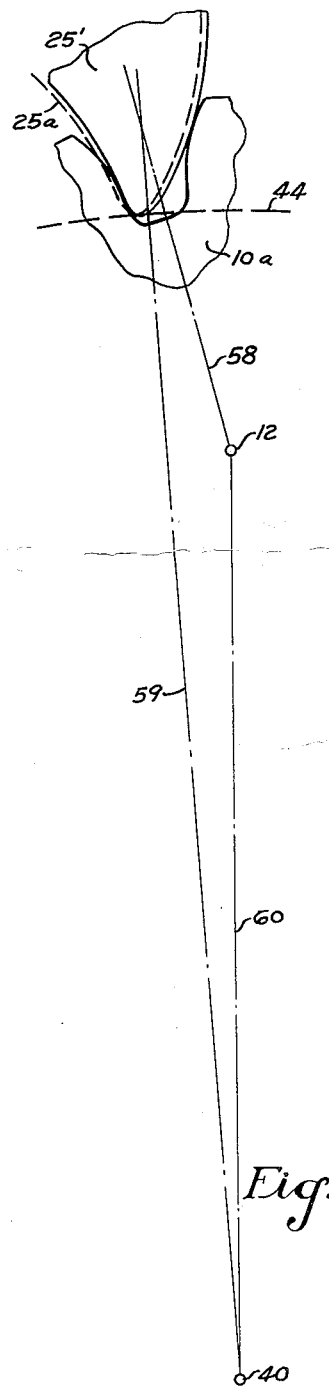
Figure 11:
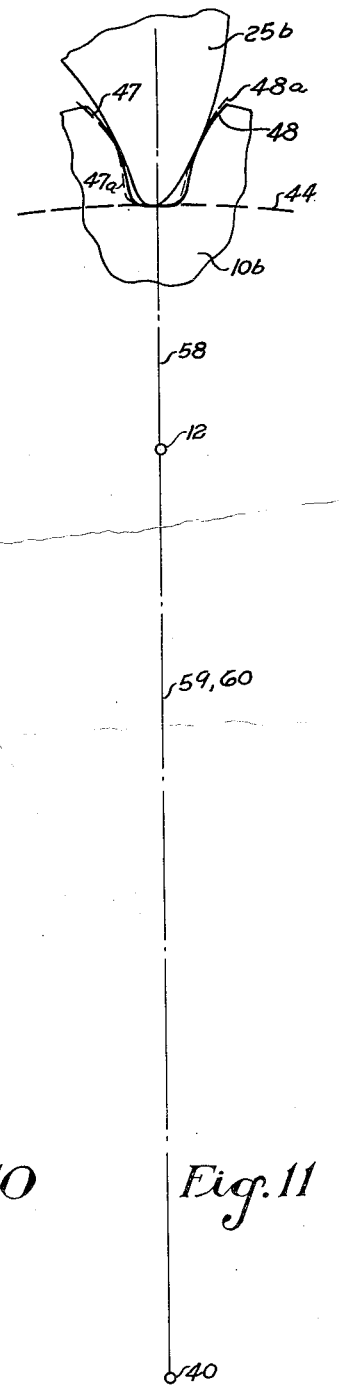
Figure 12:
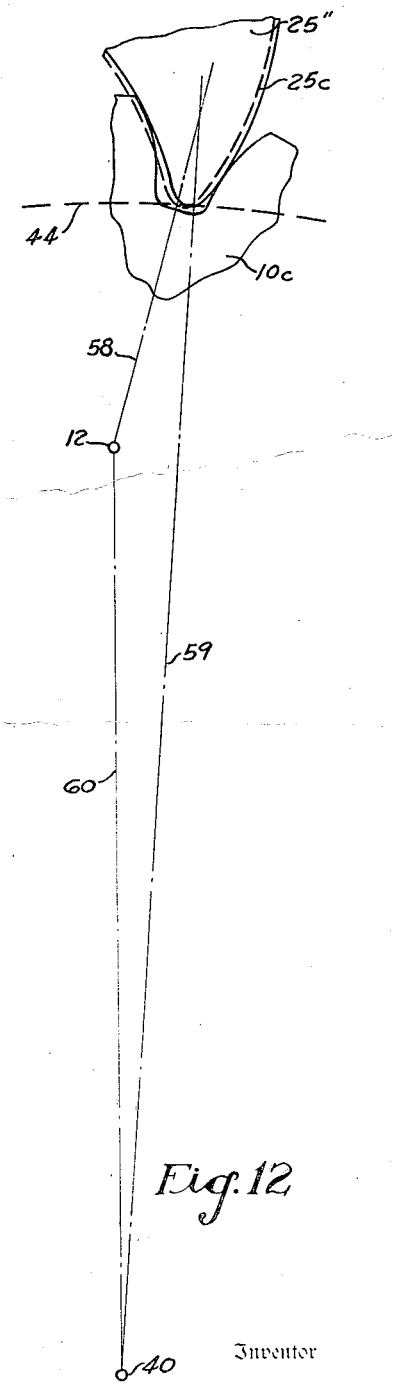

Fig. 9 is a fragmentary developed sectional view of an involute bevel gear made according to this invention having longitudinally curved teeth of zero spiral angle; and Figs. 10 to 12 inclusive are diagrammatic views illustrating different positions of a cutter and gear blank in the generating roll during simultaneous cutting of the two sides of a tooth space of a gear by the preferred method of the present invention.

In the drawings, 10 and 11 denote, respectively, the pinion and gear of a mating spiral bevel gear pair produced according to this invention. The axes of these two gear members are at 12 and 13, respectively, and intersect in the common apex 14 of the pair. In mesh, the conical pitch surface of the pinion rolls on the conical pitch surface of the gear and these pitch surfaces contact with each other along the pitch line 16 which is the instantaneous axis of relative motion of the two gears.

As is well known in the bevel gear art, if the two members of a bevel gear pair, such as the members 10 and 11, are generated conjugate to a true crown gear, that is, a crown gear having a pitch angle of 90° and an axis at 17 perpendicular to the pitch line 16, then the two members of the pair will have correct and full match, provided that the crown gear used in generating one member is the exact counterpart of the crown gear used in generating the other member. These crown gears may be provided with spherical tooth sides because this permits cutting the gear and pinion with tapering tooth depth without departure from mathematical accuracy. Thus, the crown gear used in generating the gear 11 may contain teeth 18 whose opposite sides 19 and 20 are spherical surfaces whose centers are at 21 and 22, respectively. Such a crown gear tooth can readily be represented by an annular cutter or grinding wheel whose axis 23 (Fig. 4) passes through the two sphere centers 21 and 22. An axial section of the grinding wheel or of a blade of such a cutter is denoted at 25 in Fig. 4. Opposite sides of the grinding wheel or cutter are denoted at 27 and 28, respectively. The centers of these sides are at 21 and 22, respectively.

In the conventional method of generating a bevel gear, rolling motion is effected by rotation of the work, such as gear 11, on the work axis 13 while relative rotation is produced between the cutter and the work about the crown gear axis 17 so that the pitch cone of the work rolls without sliding on the pitch plane of the crown gear. Assuming that during generation these two axes remain in fixed positions, the sphere centers 21 and 22 will then move in circular paths 24 and 24', respectively, about the crown gear axis 17. In Fig. 4, these circles appear as straight lines. Thus, if the bevel gear 11 were to be generated by the usual method of generating ordinary bevel gears with a spherical cutter, the center 21 of one side of the cutter would move during generation to position 21' while the center 22 of the other side of the cutter would move from 22 to position 22'. In the positions 21' and 22' of the cutter centers, contact between the sides of the cutting tool and the work will be in a plane containing the instantaneous axis 16 and the sphere centers 21' or 22', respectively, which means that the transverse pressure angle of the work would be changed.

To obtain involute teeth, however, the sphere centers should move in the planes of action, that is, in the planes 29 and 30, respectively (Figs. 3 and 4), tangent to the base cones of the gears and intersecting the instantaneous axis 16. That is, the sphere center 21 should move during generation in the plane 29 to a position 21''' while the sphere center 22 should move in the plane 30 to a position 22'''. In other words, as the sphere center turns about the axis 17 through an angle θ to position 21', it should also turn about the instantaneous axis 16 to move it from 21' to 21'' so that the resultant path of its movement should be from 21 to 21'''. Likewise, the other sphere center should move in a resultant path 22 to 22'''.

Let H and V denote the coordinates of the point 21 in the view of Fig. 1 and let Q denote the angle on the circle 24 between the point 21 and the axial plane 17—13. Then, $$\operatorname{ctn} Q = \frac{H}{V}$$

Distance 21—21', as it appears in the projection of Fig. 4, is then for infinitesimal displacement through an angle θ equal to $H \cdot \theta$, the angle θ being measured in radians.

The angle 21'—21—21'' (Fig. 4) equals the known transverse pressure angle $\varphi$ for one side of the gear. Hence, the distance 21'—21'' should be equal to:

(Distance 21'—21'')·sin$\varphi$ = $H \cdot \theta \sin \varphi$

The turning motion about the instantaneous axis is obtainable by turning about an axis 32 (Fig. 2) which is inclined at an angle G to the instantaneous axis 16. The turning motion about this axis can be resolved into a turning component θ about an axis 17 and into a component (θ·ctn G) about instantaneous axis 16.

The distance 21'—21'' also equals the product of (θ ctn G) and the distance of the sphere center 21 from the instantaneous axis 16, which latter is $$\frac{V}{\cos \phi}$$

Hence:

$$\frac{V}{\cos \phi}(\phi \operatorname{ctn} G) = H \cdot \theta \sin \phi$$

Whence:

$$\operatorname{ctn} G = \frac{H}{V} \sin \phi \cdot \cos \phi = \operatorname{ctn} Q \cdot \sin \phi \cdot \cos \phi$$

The above formula is obviously applicable to the other side of the tooth also if the angle P—14—22 of Fig. 1 is introduced as Q and the transverse pressure angle $\varphi$ is introduced as a negative quantity for that side. The coordinates H' and V' for the point 22 must also be used.

Involute teeth may then be obtained by generating one side of the teeth of the gear 11 from a basic gear having an axis 32 (Fig. 2) and whose pitch angle is less than 90°. The other side of the teeth of gear 11, should then be generated from a basic gear computed as above described and having a pitch angle larger than 90°. 32'' denotes the axis of such a gear. The mating sides of the other member of the gear pair may be generated from two basic gears which are counterparts of the aforesaid basic gears and which have the same axes 32 and 32', respectively. During generation of the sides of the teeth of both gear and pinion, the ratio of roll will be, of course, constant, that is, the work will rotate on its axis at a uniform velocity while work and tool are moved relative to one another about the axis of the basic gear also at a uniform velocity.

When cutting the longitudinally concave sides of the teeth of the gear 11 with the outside spherical cutting surface 27 of the cutter, the basic gear has its axis at 32 and a pitch angle G smaller than 90°. The mating longitudinally convex tooth surfaces of the pinion 10 are then generated from a basic gear having the same axis 32 and a pitch angle G' equal to 180° minus G and, therefore, larger than 90°. When generating the convex lengthwise tooth sides of the gear 11 with the inside spherical cutting edges 28 of the cutter, the basic gear has an axis 32' and a pitch angle $G_1$ larger than 90°. The mating longitudinally concave tooth surfaces of the pinion are then generated from a basic gear having the same axis 32' and a pitch angle $G_2$ equal to 180°—$G_1$, namely, smaller than 90°.

The pitch angles of the basic generating gears, that is, the positions of the axes 32 and 32' may also be obtained by erecting a normal to the plane 16—21 (Fig. 4) at point 21. This normal intersects the axial plane 12—13 in a point lying on the axis 32. Likewise, a normal erected at the point 22 to the plane 16—22 intersects the axial plane 12—13 in a point lying in the axis 32'. When the sphere center 21 is moved about an axis 32 determined in this manner, it is bound to move in a circle tangent to the plane 16—21, and likewise, the sphere center 22 is bound to move in a circle tangent to the plane 16—22 when the sphere center 22 moves about axis 32'. The above formula can be considered as an expression of this relationship. Fig. 3 shows intermeshing teeth of the pinion 10 and gear 11. On truly involute gears, mesh takes place in the two planes 29 and 30 which intersect at instantaneous axis 16 and which are tangent to the base cones 34 and 35 of the two gears. These base cones are coaxial with the axes 12 and 13, respectively. It is to be noted that in the case shown, the base cone 35 is within the root surface of the teeth of the gear 11. Contact between the mating tooth surfaces of the gear and pinion is along a line which, for one side of the teeth, moves during mesh about an axis 36 perpendicular to the plane of action 30 and passing through the common apex 14. Involute gears can be described simply and completely by development of the base cone to a plane, which shows the nature and position of said line of contact, and by the angle between the axis of the gear and the elements of the base cone.

A pair of gears produced as described conjugate to an externally and an internally tapered basic gear having spherical tooth surfaces, respectively, will transmit mathematically accurate uniform motion. The tooth shape of the gears is a close approximation of a true involute shape. For all practical purposes, namely, for purposes of adjustment, the gears so produced are involute gears. They have a constant transverse pressure angle and permit variation in the angle between the axes of the two gears. It is to be seen that the angles $G_1$ and G differ from 90° and from each other increasingly the more the angle Q, averaged for the two sides, differs from 90°. With Q averaging 90°, both angles are very close to 90°. Where the angle Q averages 90°, the gears have the same spiral angle at the large and small ends of the teeth.

With the above-described general method of generation, the tooth sides of the teeth of each member of the gear pair must be generated from different basic gears and only one side of the teeth can be cut at a time.

The preferred method of generating gears according to the present invention, however, is a process in which both sides of a tooth space of one or both members of the pair may be generated in the same operation.

Heretofore variation in the ratio of generating roll has been employed in the production of bevel gears for various purposes, as, for instance, to vary the tooth profile shape produced. I have discovered that by employing variation in the ratio of roll, both sides of a tooth space of an involute bevel gear can be generated simultaneously. The variation in ratio of roll permits of compensating simultaneously for an externally tapered basic gear and an internally tapered basic gear, so that correct tooth profiles can be produced on both sides of the tooth space with the same modification in ratio of generating roll.

It is well known that pinions conjugate to a form-cut externally tapered gear may be cut by moving the cutter in a plane tangent to the root surface of the pinion while varying the ratio of generating roll between cutter and pinion, but the variation in ratio of roll has to be reversed for the two sides of the teeth. Using the same modification in ratio of generating roll on both sides of the teeth would make one side conjugate to an externally tapered gear and the other side conjugate to an internally tapered gear. That is precisely what is needed here and that is what is employed. Modification in the ratio of roll acts faster when compensating for a basic gear of external taper than for a basic gear of internal taper. Hence, for the purposes of the present invention it is necessary to employ modification in the ratio of roll in combination with an internally tapered basic generating gear.

Fig. 5 illustrates the preferred method of generating the teeth of the pinion 10. The cutting tool here employed is an annular grinding wheel 25 having outside and inside spherical grinding surfaces 27 and 28, respectively, of convex and concave profile shape, respectively, whose centers are at 21 and 22, respectively, on the wheel axis 23. The wheel is tipped as shown. Generation of the tooth surfaces is effected by rotating the wheel 25 on its axis 23 in engagement with the pinion blank 10 while rotating the work on its axis 12 and effecting relative rotational movement between the tool and the work about the axis 40 of the generating gear. The pitch angle $G_1$ of this generating gear exceeds 90°. During the generating roll, the ratio of rotation of the work on its axis 12 to the relative rotary movement about the basic gear axis 40 is modified. The amount of variation in ratio of roll is such as to obtain tooth shapes on opposite sides of the tooth surfaces such as might be produced by generating these same tooth surfaces one side at a time with uniform ratio of roll and conjugate to an externally and an internally tapered basic gear, respectively. The pitch line of the generating gear is denoted at 41.

The tooth surfaces of mating gear 11 may be generated with the same annular grinding wheel 25 again tipped relative to the work. In the generating operation, the wheel is rotated on its axis 23 while the work is rotated on its axis 13 and the work and tool are rotated relative to one another about the axis 42 of the generating gear. During the generating operation, the ratio of roll between the work rotation and the relative movement about the generating gear axis is again modified to obtain the desired results. The pitch surface of the generating gear is denoted at 43.

Figs. 10 to 12 inclusive illustrate the effect of the modification in ratio of generating roll when generating opposite sides of a tooth space of either gear or pinion simultaneously conjugate to an internal tapered gear. Here the generation of opposite sides of a tooth space of the pinion is shown specifically. The views are in the back cone developments. Hence the pinion and basic generating gear appear as though they were spur pinion and internal spur gear.

In the embodiment of the invention illustrated in Figs. 10 to 12 inclusive, it is assumed that the work rotates on its axis 12 at a uniform velocity during generation while the cutter moves at a varying velocity about the axis 40 of the generating gear. The uniform motion of the blank combines with the varying motion of the cutter to produce the required variation in ratio of generating roll. In the generating operation the tool 25 represents, of course, a tooth of the generating gear. The tip surface of this gear is denoted at 44.

Figs. 10, 11, and 12 show corresponding positions of the tool and work for equi-spaced positions of the work as it rotates on its axis 12. Were the tool to move during generation at a uniform rate about the axis 40 of the generating gear, it would move from dotted line position 25a, shown in Fig. 10, to full line position 25b, shown in Fig. 11, while the work was simultaneously rotating about its axis 12 at a uniform rate from its position 10a of Fig. 10 to its position 10b of Fig. 11, and the tool would move from position 25b of Fig. 11 to dotted line position 25c of Fig. 12 while the work was moving from position 10b of Fig. 11 to position 10c of Fig. 12. The tooth profiles, which would be generated on opposite sides of a tooth space during such uniform roll of tool and work together, would be such as are shown in dotted lines at 47a and 48a, respectively, in Fig. 11. These profiles are unsymmetrical and are not true involutes.

With the method of the present invention, however, the tool moves at a non-uniform rate about the axis 40 of the generating gear as the work rotates at a uniform rate on its axis 12. Thus, with the present invention, the tool occupies full-line position 25' instead of dotted-line position 25a when the work is in the position 10a of Fig. 10, and the tool occupies full-line position 25'' instead of dotted line position 25c when the work is in the position 10c of Fig. 12. In other words, with the present invention the tool moves from position 25' to position 25b to position 25'' at a non-uniform rate while the work is rotating at a uniform rate from position 10a to 10b to 10c. Thus the tool may generate simultaneously opposite side tooth surfaces 47 and 48 which are of true involute profile shape. It will be noted that the profile 47 is less curved than profile 47a while profile 48 is more curved than profile 48a. The profiles 47 and 48 are symmetrical and may be involutes.

In Figs. 10, 11, and 12, the lines 58 and 59 are lines drawn radially from the work and basic gear axes 12 and 40, respectively, and median of the tooth space of the work and tooth of the basic gear, respectively. The line 60 is a line connecting the work and basic gear axes. In Figs. 10 and 12, the differences between the dotted-line positions of the tool for uniform ratio of roll and the full-line positions of the tool for varied ratio of roll are somewhat exaggerated for the purpose of clearness in illustration.

In the instances shown in Figs. 5 and 6, fully matched mating tooth surfaces can be obtained. Here, the pitch angles $G_a$ and $G_b$ of both basic generating gears exceed 90°. Broadly, the sum of said pitch angles of the basic generating gears will exceed 180° at least, when full match of the tooth surfaces is desired or little mismatch is sought. In this case, at least one of the pitch angles is greater than 90°.

In practice, however, a slight mismatch or easing-off at the ends of the gear teeth and at the tops and bottoms of the tooth profiles is desired. Such ease-off or mismatch can be produced by application of well-known principles, among which are the use of a slightly larger radius on the outside spherical surface of the cutter than on the inside spherical surface. Primarily, this causes lengthwise mismatch of the mating tooth surfaces with an ease-off of the tooth contact at the ends of the teeth. Ease-off of the contact at the upper and lower ends of the tooth profiles may be obtained by using a cutter whose outside cutting surface has a profile less curved than a spherical profile and whose inside cutting surface has a profile more curved than a spherical profile.

Figs. 7 and 8 are developments to a plane of the base cone of the pinion 10 and gear 11, respectively. The teeth of the pinion are denoted at 45 and the teeth of the gear at 46. The sides of the pinion teeth are curved lengthwise along circular arcs 47 and 48, while the mating tooth sides of the gear are curved lengthwise along circular arcs 47' and 48'. Opposite sides 47 and 48 or 47' and 48' of a tooth space are inclined to one another and the tooth space tapers from end to end. The tooth bottoms or root lines 49 and 50 (Figs. 5 and 6) are inclined to the base cones 34 and 35, respectively, and when extended ordinarily pass outside of the cone apex 14, at least on gears cut "duplex," that is, cut two sides of the tooth spaces simultaneously on both members of the gear pair.

Fig. 9 is a development to a plane of a base cone of a zero spiral angle gear 52 cut according to the present invention. The apex of this gear is denoted at 53 and its projected axis at 54. Its teeth are designated at 55 and the opposite sides of the teeth are curved longitudinally along circular arcs as denoted at 56 and 57. Here the teeth are of zero spiral angle at the center of the tooth length, that is, the sides of the teeth are tangent to lines radial of the gear apex at points midway of the length of the teeth. As in the previously described embodiments of the invention, the tooth spaces of this gear taper in width from end to end, being larger at the outer ends of the teeth, and, as in the previously described embodiments of the invention, the root lines of the teeth are inclined to the base cone.

While the process for cutting mating gears illustrated in Figs. 5 and 6 has been described in connection with the production of longitudinally curved tooth gears of involute form, it is to be understood that the idea of employing variation in the ratio of generating roll in conjunction with generation from a tapered basic gear has a broader application, and that it may be employed for various other purposes. It provides a means for altering the adjustment characteristics of generated bevel gears to suit various purposes and wishes while retaining the high production of the duplex method.

As already indicated, gears may be cut or ground by the present invention and since a grinding wheel is simply a cutter having an infinite number of cutting edges, the term cutter as used hereinafter in the claims will be understood to include a grinding wheel, and likewise the term "cutting edge" will be understood to include the operating profile or surface of a grinding wheel.

It will be further understood that while the invention has been described in connection with particular embodiments thereof, it is capable of still further modification and this application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of generating tooth surfaces of a longitudinally curved tooth bevel gear which comprises cutting both sides of each of its tooth spaces simultaneously by rotating an annular tool, that has outside and inside cutting edges of convex and concave profile shape, respectively, in engagement with the work while effecting a relative rolling motion between the tool and work as though the work were rolling on an internal tapered gear represented by the tool, and varying the ratio of the rolling motion during generation.

2. The method of generating a bevel gear which comprises cutting opposite sides of its teeth by positioning an annular tool, that has side-cutting edges of circular arcuate profile shape, in engagement with the work so as to cut tooth surfaces tapering in depth from end to end, and rotating said tool in engagement with the work while effecting a relative rolling motion between the tool and work as though the work were rolling with a basic gear, represented by the tool, the basic gear employed during generation of one side of the teeth being an externally tapered basic gear and the basic gear employed during generation of the opposite sides of the teeth being an internally tapered basic gear.

3. The method of generating a bevel gear which comprises cutting both sides of its tooth spaces simultaneously by rotating an annular tool having outside and inside cutting edges of circular arcuate profile shape in engagement with the work while effecting a relative rolling motion between the tool and work as through the gear, which is being cut, were rolling with an internal bevel gear represented by the tool, and varying the ratio of the rolling movement during generation.

4. The method of generating a pair of bevel gears which comprises cutting both sides of each tooth space of each member of the pair simultaneously by rotating an annular tool, which has outside and inside cutting edges of circular arcuate profile shape, in engagement with the work while effecting a relative rolling motion between the tool and work as though the gear, which is being cut, were rolling with a generating gear represented by the tool whose pitch angle differs from 90°, and varying the ratio of the rolling movement during generation, the pitch angle of the generating gear used during generation of one member of the pair, at least, being greater than 90°.

5. The method of generating a pair of bevel gears which comprises cutting both sides of each tooth space of each member of the pair simultaneously while rotating an annular tool, which has outside and inside cutting edges of circular arcuate profile shape, in engagement with the work while effecting a relative rolling motion between the tool and work as though the gear, which is being cut, were rolling with a gear, which is represented by the tool, whose pitch angle is greater than 90°, and varying the ratio of the rolling movement during generation.

6. The method of cutting opposite sides of a tooth space of a tapered gear simultaneously which comprises imparting a cutting motion to a tool while effecting a relative rolling motion between the tool and work as though the work were rolling with a tapered gear represented by the tool which has a pitch angle of more than 90°, the ratio of the rolling motion being varied during cutting.

7. The method of cutting opposite sides of a tooth space of a tapered gear simultaneously which comprises positioning an annular tool, that has inside and outside cutting edges of concave and convex profile shape, respectively, in engagement with the work with the axis of the tool inclined at other than right angles to the pitch surface of the work so as to cut a tooth space tapering in depth from end to end, and rotating the tool while effecting a relative rolling motion between the tool and work as though the work were rolling with an internal tapered gear represented by the tool which has a pitch angle of more than 90°, and varying the ratio of the rolling motion during cutting.

8. The method of cutting a pair of tapered gears which comprises cutting opposite sides of each tooth space of each member of the pair simultaneously with an annular tool, that has inside and outside cutting edges of concave and convex profile shape, respectively, by positioning said tool in engagement with the work with the axis of the tool inclined at other than right angles to the pitch surface of the work so as to cut a tooth space tapering in depth from end to end, and rotating the tool on its axis while rotating the work on its axis at a uniform velocity and simultaneously effecting relative rotational movement between the tool and work at a varying velocity about another axis which is inclined to the pitch surface of the work at an angle greater than 90°.

ERNEST WILDHABER.

REFERENCES CITED

The following references are of record in the file of this patent:

UNITED STATES PATENTS

| Number | Name | Date |
| --- | --- | --- |
| 1,973,135 | Adams | Sept. 11, 1934 |
| 1,973,185 | Trbojevich | Sept. 11, 1934 |
| 1,980,365 | Wildhaber | Nov. 13, 1934 |
| 2,285,133 | Wildhaber | June 2, 1942 |
| 2,308,558 | Wildhaber | Jan. 19, 1943 |
| 2,310,484 | Wildhaber | Feb. 9, 1943 |
| 2,342,232 | Wildhaber | Feb. 22, 1944 |